Sept. 23, 1947.   D. W. EXNER   2,427,719
POLARIZED DIRECT CURRENT CONTACTOR
Filed April 27, 1943

WITNESSES:

INVENTOR
Donald W. Exner.
BY
ATTORNEY

Patented Sept. 23, 1947

2,427,719

UNITED STATES PATENT OFFICE 2,427,719

POLARIZED DIRECT-CURRENT CONTACTOR

Donald W. Exner, Lima, Ohio, assignor to Westinghouse Electric Corporation, East Pittsburgh, Pa., a corporation of Pennsylvania Application April 27, 1943, Serial No. 484,715

4 Claims. (Cl. 175—320)

1

My invention relates to contactors and, more particularly, to a combination polarity-determining contactor and circuit making and breaking device for use in battery charging circuits, or the like.

In circuits, for example, such as those normally used in railway car lighting and aircraft service in which the electromotive force is acquired from batteries and in which it is necessary to service and inspect the electric installation, it becomes necessary to have adequate protective means for preventing the batteries from being connected to the usual charging devices in a reverse manner. It is obvious that if a battery were connected in a reverse manner to a charging device said battery would become deenergized rather than charged.

It is understood that with well known DC contactors or relays the energizing coil will draw and hold the armature in a contact-engaged position regardless of the direction of flow of the current therethrough. Such a structure in itself obviously could not be used to protect a battery from faulty connection with a charging device. However, in keeping with the teachings of my invention I have provided means for preventing the full energization of said coil except when the current flowing through the coil is in a given predetermined direction.

It is, therefore, an object of my invention to provide a polarity-determining device to be associated with a charging circuit for a battery which will function as a main contactor and at the same time will prevent the battery from being connected to the circuit except when the current will flow in the proper direction without the use or need of any auxiliary directional relays or the like.

Another object of my invention is to provide a polarity-determining contactor for a battery charging system embodying an auxiliary contact and actuating means which are responsive to the polarity of the charging system and which will permit the main contactor to close or become engaged only if the resulting charging current will flow in the correct direction.

A further object of my invention is to provide a polarity-determining contactor and switching device which is actuated by means of an electromagnet and which has associated therewith a permanent magnet utilized to actuate an auxiliary contact only if the polarity of the charging source is in the proper direction.

And a still further object of my invention is to modify and improve existing direct current contactors for use as directional relays as well as circuit makers and breakers by associating therewith a rotatably mounted permanent magnet which actuates an auxiliary contactor utilized to regulate the energization of the main electromagnet only when said electromagnet is energized by the correct flow of current therethrough.

Other objects and advantages of my invention will either be pointed out specifically in the course of the following description of a device embodying my invention or will be apparent from such description, in which.

Figure 1:
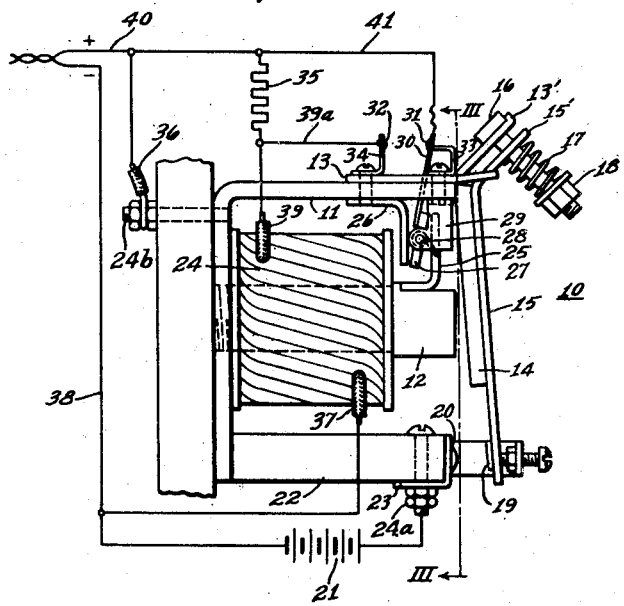
Figure 1 is a view in side elevation of a relay constructed in accordance with my invention and illustrating how the relay may be connected into a circuit.

Referring to the accompanying drawing, there is shown a direct current contactor or relay embodying a substantially L-shaped soft iron frame 11 and a soft iron core 12 rigidly attached thereto so as to form substantially a U-shaped structure. A rearwardly and upwardly extending portion 13' of a bracket 13 is rigidly attached to or formed in the upper end of the frame 11 to receive and support an armature 14. The armature 14 is formed of an elongated iron member and is disposed in alignment with the core 12 so as to be capable of bridging across the ends of the frame 11 and core 12. The frame 11, core 12 and armature 14 thus form a complete magnetic circuit.

A bracket 15 is rigidly attached to the armature 14 and has a forwardly and upwardly extending end 15' disposed at the upper or hingable end of the armature 14. The brackets 13 and 15 are notched so as to fit together and provide means for oscillatory movements of armature 14. A bolt 16 passes through the two projections 13' and 15' and has a compression spring 17 positioned thereabout to normally hold the armature in position, as shown, upon the upper end of the frame 11, in keeping with the teaching of Willard G. Cook in Patent 1,753,983, assigned to the assignee of this invention. A nut 18 is threaded upon the lower end of the bolt to compress the spring 17 and bias the bracket 15 toward the bracket 13. The biasing action of spring 17 thus permits the armature 14 to oscillate about the upper end of the frame 11 as a fulcrum.

A movable contact 19 is rigidly attached to the lower or free end of the bracket 15. This movable contact 19 engages a stationary contact 20 when the armature 14 moves to a closed position. The stationary contact 20 is rigidly attached to a rearwardly extending insulating member 22, which is positioned below core 12, by means of a bracket member 23 and terminal member 24a. The insulating member 22 is attached at one end thereof to the frame 11. The contacts 19 and 20 are the main contacts and are connected in series with the battery charging circuit so as to connect a battery 21 with a charging device (not shown) when it is desired to charge the battery, as is hereinafter more fully described.

An actuating coil 24 is positioned about the core 12 and is connected across the buses 38 and 40, leading to the charging device (not shown), by means of conductors 37 and 39 so as to receive current therefrom. Coil 24 causes the armature 14 to assume the contact closing position when the current is flowing in a proper direction through coil 24 as is hereinafter more fully described.

An upwardly extending L-shaped soft iron bar or arm 25 is either formed integrally with or rigidly attached to the upper portion of the exposed end of the core 12. This arm 25 extends toward the upper end of the soft iron frame 11. A second or downwardly extending arm 26 is rigidly attached to the lower surface of the frame 11 so as to extend towards the core 12. The second arm 26 is positioned inwardly from the upper end of the frame a sufficient distance to permit a rotating permanent magnet 27 to be positioned between said arm 26 and the arm 25 attached to the core 12. With the two arms 25 and 26 rigidly attached to the core 12 and the frame 11, respectively, it is obvious that a certain portion of the flux flowing through the core 12 and frame 11 will pass outwardly along said arms and through the permanent magnet 27 located therebetween.

The permanent magnet 27 is a relatively small member rotatably mounted by means of a nonmagnetic pin 28 which passes transversely therethrough. Said pin 28 is supported by a nonmagnetic bracket 29 attached to the end of the frame 11. The magnet 27 is thus supported between the arms 25 and 26, in this instance, with its north pole positioned upwardly. The magnet 27 is therefore, free to move about the pin 28 in response to the direction of flow of the magnetizing force between the two arms 25 and 26.

A contact carrying arm 30 is rigidly atached to the upper or north pole end of the permanent magnet 27 so as to move in response to the movements of the permanent magnet 27. A movable auxiliary contact 31 is located upon the free end of the arm 30 so as to engage a stationary auxiliary contact 32, when the current flowing through the coil 24 is indicative of a proper direction of flow of the current through the charging circuit. If the flow of current through the charging circuit would be in a reverse or improper direction, said permanent magnet 27 will rotate in a clockwise direction maintaining the movable auxiliary contact 31 in engagement with a stop member 33. The stationary auxiliary contact 32 and stop portion 33 are supported by insulating brackets 34 and 34′, respectively attached to the frame 11.

A resistor 35 is connected in series with coil 24 when the relay is first energized. However, the auxiliary contacts 31 and 32 close or connect a shunting circuit 39a—41 around the resistor 35 when the charging circuit is connected in a proper manner. The resistor 35 is initially connected in series with the coil 24 to reduce the quantity of current flowing therethrough so as to reduce the electromagnetic effect developed by said coil when the circuit is connected in a reverse order. This prevents the armature 14 from being drawn into a contact closed position and thus prevents the battery 21 from being connected to the charging device in a reverse manner.

In the operation of a relay embodying my invention one terminal of the battery 21 is connected to a first terminal of the coil 24 through conductor 37 and to the charging device (not shown) through conductor 38. The second terminal of the battery is connected to the main relay terminal 24a and stationary main contact 20. The movable main contact 19 is connected to the second terminal of the charging device by conductor 40 through the armature 14, frame 11, main terminal 24b attached to said frame and conductor 36. The second terminal of the energizing coil 24 is connected to the stationary contact 32 and one side of resistor 35 by conductors 39 and 39a. The second side of resistor 35 and the movable auxiliary contact 31 are connected together by conductor 41 to provide a shunting circuit around the resistor 35 and are also connected to the conductor 36 and the second terminal of the charging device through conductor 40.

Figure 2:
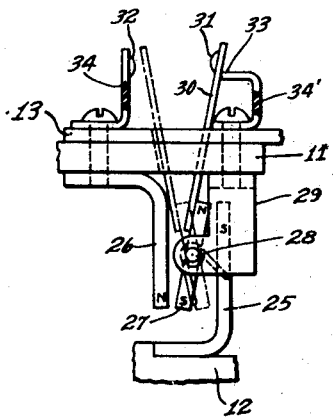
Fig. 2 is a fragmentary enlarged view of a portion of my relay structure.
Figure 3:
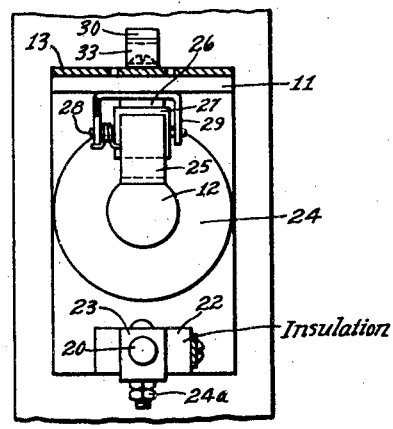
Fig. 3 is a view taken along the line III—III of Fig. 1.

When the buses 38 and 40 are energized current from the charging device (not shown) will flow only through the resistor 35 and the coil 24 as long as the main contacts 19 and 20 are open. The resistor 35 being in series with the coil 24 substantially reduces the flow of current therethrough. However, said coil 24 will develop a certain predetermined quantity of magnetizing flux in a clockwise or counterclockwise direction through the frame 11, armature 14 and core 12, depending upon the direction of the current flowing through coil 24. In addition, a certain quantity of magnetizing flux will pass through arms 25 and 26 and permanent magnet 27. If the current from the charging device has an improper direction, the magnetic flux through the relay causes arm 25, to become a south pole while arm 26 becomes a north pole (see Fig. 2). The permanent magnet 27, having its north pole extending upwardly, will then be biased in the clockwise direction and maintains the auxiliary contacts 32 and 31 in an open position. The magnetic flux now developed by coil 24 is insufficient to draw the armature 14 into closed position because resistor 35 remains effective in series with coil 24 and weakens its excitation.

However, when the system is connected to the charging device in a proper manner so that the current flowing therefrom is in the correct direction to charge the battery 21, the flux developed by the coil 24 causes arms 25 and 26 to become a north pole and south pole respectively. The permanent magnet 27 is then rotated in a counterclockwise direction and moves the auxiliary contact 31 into engagement with the stationary auxiliary contact 32. A shunting path through conductor 41 and cooperating auxiliary contacts 31 and 32 is therefore established across resistor 35. Accordingly, the coil 24 is now connected directly across the charging device so that an increased magnetic flux is developed by the coil. This increase in flux will draw the armature 14 downwardly against the core 12, and the main contacts 19 and 20 close and connect the charging device (buses 38 and 40) to the battery 21.

When using the relay embodying my invention in battery charging circuits, for example, it is apparent that the batteries cannot be connected to the charging device except in a proper manner. This protection is obtained without the use of any auxiliary or secondary relay or protective device, a feature which results in a reduced amount of metal being used and a considerable reduction in weight and space required.

Various modifications may be made in the device embodying my invention without departing from the spirit and scope thereof, and I desire, therefore, that only such limitations shall be placed thereon as are imposed by the prior art and the appended claims.

I claim as my invention:

1. An electromagnetic direct current contactor, comprising main contacts and auxiliary contacts, a stationary soft-magnetic structure having a leg portion and a core portion extending substantially in parallel to each other, an armature disposed for controlling said main contacts and being pivoted on said leg portion for angular motion toward and away from said core so as to form a first magnetic flux path therewith, spring means for biasing said armature away from said core, two magnetizable pole pieces mounted on said leg and core portions respectively and extending toward each other so as to form a field gap between them in magnetic parallel arrangement to the gap formed between said core portion and said armature when the latter is in its position away from said core portion, a permanent magnet member disposed for controlling said auxiliary contacts and being rotatably mounted in said field gap, an energizing coil disposed on said core portion, terminal means for supplying direct current to said coil, and current-limiting circuit means controlled by said auxiliary contacts for reducing said current to an amount insufficient for closing said armature against its bias when said permanent magnet is in a given position depending upon the polarity of said current.

2. A direct-current contactor, comprising a soft-magnetic structure having a stationary core member and an armature movable toward and away from said core member, said armature forming a magnetic circuit together with said core member, spring means for biasing said armature away from said core member, an energizing winding for providing magnetization for said core member in order to cause said core member to move said armature when said magnetization is stronger than the armature bias, a permanent magnet pivoted on said structure so as to be movable between two positions and being arranged to form a shunt path in said magnetic circuit in parallel relation to said armature in order to change its position in dependence upon the reversal of current flow in said winding, and resistance means controlled by said permanent magnet and connected with said winding for reducing said magnetization so as to prevent said core member from moving said armature when said permanent magnet is in a given position.

3. An electromagnetic direct current contactor, comprising main contacts and auxiliary contacts, a stationary soft-magnetic structure, an armature disposed for controlling said main contacts and being disposed relative to said structure so as to form a first magnetic flux path therewith, said armature being movable between two positions relative to said structure and biased for motion away from said structure, a permanent magnet member disposed for controlling said auxiliary contacts and being movable between two positions relative to said structure, said structure having poles extending close to said magnet member so as to form therewith a second magnetic flux path, an energizing winding disposed on said structure, terminal means for supplying direct current to said coil, and circuit means controlled by said auxiliary contacts and connected with said winding for preventing said winding from moving said armature against its bias when said permanent magnet member is in a given one of its two positions depending upon the polarity of said current.

4. An electromagnetic direct current contactor, comprising main contacts and auxiliary contacts, a stationary soft-magnetic structure having a leg portion and a core portion extending substantially in parallel to each other, an armature disposed for controlling said main contacts and being pivoted on said leg portion for angular motion toward and away from said core so as to form a first magnetic flux path therewith, means for biasing said armature away from said core, a permanent magnet member disposed for controlling said auxiliary contacts and being pivotally mounted on said structure between said leg and core portions so as to form therewith a second magnetic flux path in parallel to said first flux path, and an energizing coil disposed on said core portion, terminal means for supplying direct current to said coil, and circuit means controlled by said auxiliary contacts and connected with said coil for preventing said armature from being moved by said core portion against the armature bias when said permanent magnet member is in a given position depending upon the polarity of said current.

DONALD W. EXNER.

REFERENCES CITED

The following references are of record in the file of this patent:

UNITED STATES PATENTS

| Number | Name | Date |
|---|---|---|
| 1,142,852 | Simon | June 15, 1915 |
| 2,245,391 | Dicten | June 10, 1941 |
| 374,673 | Griscom | Dec. 13, 1887 |
| 569,634 | Gharky | Oct. 20, 1896 |
| 698,027 | Knapp | Apr. 22, 1902 |
| 821,586 | Gough | May 22, 1906 |
| 1,837,188 | Keller | Dec. 22, 1931 |
| 733,627 | Cox | July 14, 1903 |
| 2,126,562 | Lakatos | Aug. 9, 1938 |
| 2,284,755 | Melick | June 2, 1942 |
| 2,081,991 | Exner | June 1, 1937 |
| 892,655 | Duryee | July 7, 1908 |
| 969,345 | Culver | Sept. 6, 1910 |
| 1,193,537 | Girardeau | Aug. 8, 1916 |
| 1,250,152 | Eisenmann | Dec. 18, 1917 |
| 1,507,300 | Replogle | Sept. 2, 1924 |
| 1,752,900 | Eisenmann | Apr. 1, 1930 |
| 863,692 | Bliss | Aug. 20, 1907 |
| 1,989,057 | Kongsted | Jan. 22, 1935 |